United States Patent [19]
Kobayashi et al.

[11] Patent Number: 4,467,371
[45] Date of Patent: Aug. 21, 1984

[54] METHOD OF PRE-EDITING AN ORIGINAL VIDEO TAPE IN COMBINATION OF SCENE NUMBERS WITH A CARD AND SYSTEMS FOR CARRYING OUT THE METHOD

[75] Inventors: Yosoji Kobayashi, Kanagawa; Yoshitaka Kato, Tokyo; Kyoichi Tokiwa, Tokyo; Yukinori Yoneda, Tokyo; Hiroyuki Maie, Tokyo; Minoru Tamagami, Tokyo; Shoji Motohashi, Tokyo; Tatsuo Konishi, Tokyo; Shigeru Araki, Tokyo, all of Japan

[73] Assignees: Nippon Television Network Corp.; Nippon Electric Co., Ltd., both of Tokyo, Japan

[21] Appl. No.: 484,300

[22] Filed: Apr. 18, 1983

Related U.S. Application Data

[63] Continuation of Ser. No. 169,366, Jul. 16, 1980, abandoned.

[51] Int. Cl.³ .................... H04N 5/782; G11B 27/08; G11B 27/10
[52] U.S. Cl. .................. 360/14.3; 358/335; 360/33.1
[58] Field of Search ............... 358/310, 311, 320, 335, 358/337, 339, 107, 906, 109, 209; 360/13, 14.1, 14.2, 14.3, 33.1, 35.1; 369/19, 20, 83, 84

[56] References Cited

U.S. PATENT DOCUMENTS

| | | | |
|---|---|---|---|
| 3,740,463 | 6/1973 | Youngstrom et al. | 360/14 |
| 4,040,098 | 8/1977 | Beeson et al. | |
| 4,067,049 | 1/1978 | Kelly et al. | 360/14 |
| 4,159,480 | 6/1979 | Tachi | 360/14 X |
| 4,189,756 | 2/1980 | Ninomiya | 360/14.2 |
| 4,210,940 | 7/1980 | Prysby et al. | 360/14 X |
| 4,222,069 | 9/1980 | Groetschel | 369/6 |

OTHER PUBLICATIONS

Fujimura et al., "An Automatic Video-Tape Editing/Splicing System Using a Process Computer", Journal of the SMPTE, vol. 76, No. 3, pp. 169-176, Mar. 1967.
Schneider, "Edit List Management", Journal of the SMPTE, vol. 88, pp. 538-542, Aug. 1979.

Primary Examiner—Donald E. McElheny, Jr.
Attorney, Agent, or Firm—Hopgood, Calimafde, Kalil, Blaustein & Judlowe

[57] ABSTRACT

For use in pre-editing a video tape, an original video tape is prepared by automatically recording successive scene numbers on a video tape in correspondence to the respective scenes being recorded on the tape. As the scenes are displayed in combination with the scene numbers, those of successive numbers preliminarily recorded on a card in one-to-one correspondence to the scene numbers are marked, which correspond to the scenes to be selected. The marked numbers are read while signals representative of the scenes and the scene numbers are reproduced from the original video tape. Each time correspondence between the marked numbers and the reproduced scene numbers is detected, scenes corresponding to the detected scene numbers are automatically transferred to another video tape to thereby complete the scene-selected video tape. The scene numbers may be recorded on the cue track to be visually displayed as successive numerals together with the corresponding scenes.

1 Claim, 7 Drawing Figures

METHOD OF PRE-EDITING AN ORIGINAL VIDEO TAPE IN COMBINATION OF SCENE NUMBERS WITH A CARD AND SYSTEMS FOR CARRYING OUT THE METHOD

This application is a continuation of application Ser. No. 169,366, filed July 16, 1980, now abandoned.

BACKGROUND OF THE INVENTION

This invention relates to a video tape pre-editing method for dubbing selected scenes from an original video tape on which a sequence of scenes are recorded at various spots of news events, document programs or the like. This invention relates also to a system for use in carrying out the method.

For broadcasting news events, document programs or the like, a great number of scenes are previously picked up by a cameraman and recorded on a video tape to provide an original video tape. In a pre-editing process, a lesser number of scenes are coarsely selected by a director from the great number of the picked up scenes recorded on the original video tape and recorded on another video tape to provide a scene-selected video tape. After the pre-editing process, an editing process is carried out to edit on a program video tape a sequence of scenes which is further selected from the lesser number of the scenes recorded on the scene-selected video tape and which is to be televised in order.

In a conventional video tape pre-editing method, a memorandum is separately prepared, on which various items are written, such as the names and/or addresses of the spots. On reproducing the original video tape, check marks are marked on the memorandum. The pre-edition is carried out by manually selecting the scenes in compliance with the check marks and transferring the selected scenes onto another video tape.

Such a conventional method of pre-editing the original video tape is time consuming. In addition, much labor is necessary.

SUMMARY OF THE INVENTION

It is, therefore, an object of this invention to provide a method of pre-editing an original video tape, by which it is possible to save a considerable amount of time and labor.

It is another object of this invention to provide a recording system for use in the method mentioned above, wherein scene numbers are automatically recorded in one-to-one correspondence to scenes.

It is a further object of this invention to provide a pre-editing system for use in the above-mentioned method, which is capable of automatically picking up selected scenes from an original tape to record the selected scenes on a video tape serving as the scene-selected video tape.

A method to which this invention is applicable is for providing a scene-selected video tape from an original video tape on which a sequence of successive scenes and a sequence of scene numbers are recorded. The scene numbers correspond to the successive scenes. The method of the present invention comprises the steps of preparing a card on which a sequence of successive numbers is preliminarily described with the successive numbers corresponding to the scene numbers, displaying the successive scenes in combination with the corresponding scene numbers, selecting those of the successive scenes from the displayed scenes which are to be pre-edited on the scene-selected video tape, recording a mark on the successive numbers in compliance with the scene number displayed in combinaton with each of the selected ones of the successive scenes to provide a marked card, comparing the original video tape with the marked card to select those of the scene numbers which are coincident with the marked ones of the successive numbers to provide a sequence of indications indicative of the coincidence, and automatically recording the selected scenes with reference to the sequence of indications on another video tape as a sequence of selected scenes to provide the scene-selected video tape.

DESCRIPTION OF THE PREFERRED EMBODIMENTS

Figure 1:
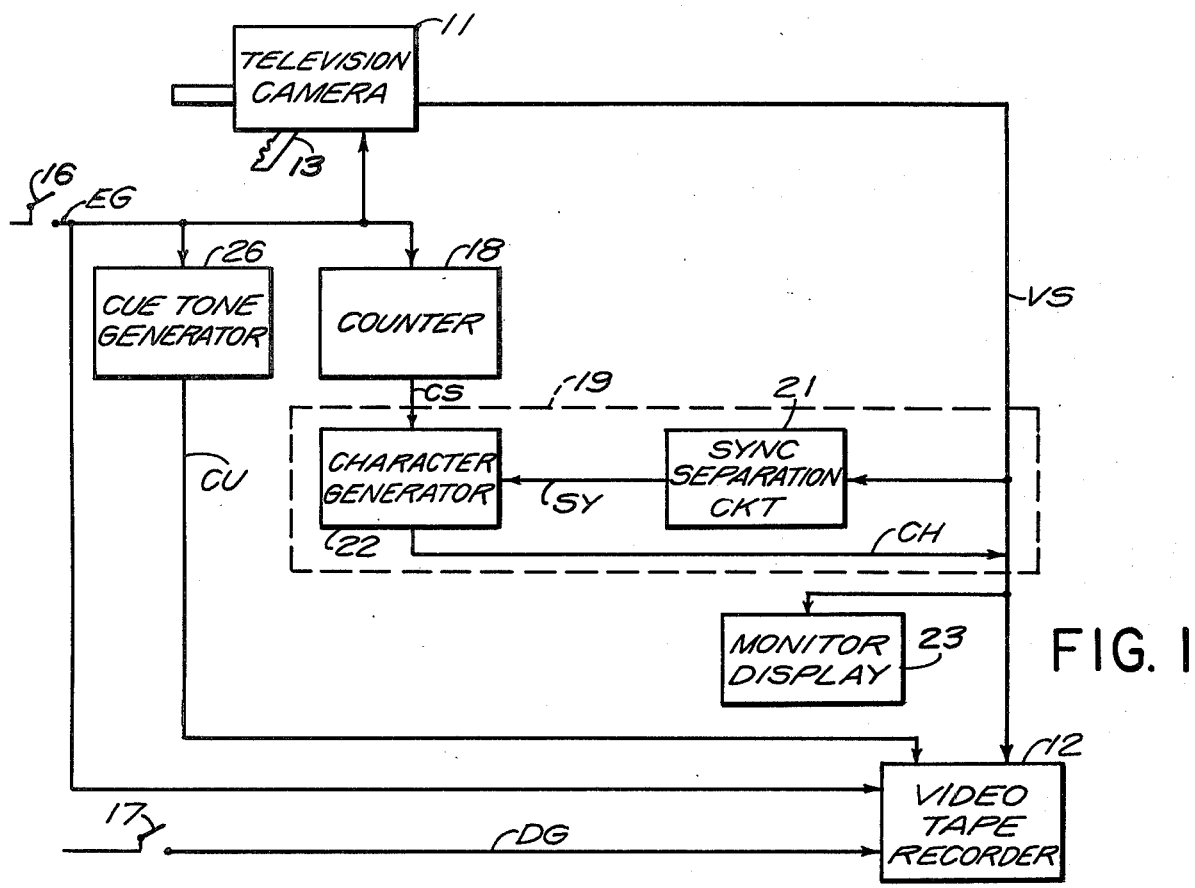
FIG. 1 is a block diagram of a system according to a first embodiment of this invention for use as a scene number recording system.

Referring to FIG. 1, a system according to a first embodiment of this invention is for use as a scene number recording system for recording a sequence of successive scenes and a sequence of scene numbers corresponding to the successive scenes on a video tape. The scene number recording system comprises a television camera 11 and a video tape recorder 12. The television camera 11 has a handle 13 and start and stop buttons 16 and 17 which are attached to the handle 13 although shown separately from the handle 13. The start and the stop buttons 16 and 17 are manually operated by a cameraman carrying the television camera 11. An energizing pulse EG is repeatedly produced each time when the start button 16 is operated. Similarly, a disenergizing pulse DG is produced by the stop button 17. The television camera 11 and the video tape recorder 12 are simultaneously started by the energizing pulse EG and are kept in operation until production of the disenergizing pulse DG. Responsive to the energizing pulses EG, the television camera 11 produces a sequence of video signals VS representative of the successive scenes, respectively. Each of the video signals VS includes a repetition of synchronizing signal components.

Further referring to FIG. 1, the system comprises a counter 18 for counting the energizing pulses EG to produce a sequence of count signals CS indicative of the counts of the energizing pulses EG. Each of the count signals CS is produced when each energizing pulse EG is counted by the counter 18. Connected to the counter 18, a converter 19 converts the count signals CS to a sequence of scene number signals representative of the scene numbers. Each of the scene number signals is produced in response to each of the count signals CS. The illustrated converter 19 comprises a separating circuit 21 and a character generator 22. Connected to the television camera 11, the separating circuit 21 serves to separate the synchronizing signal components SY from the video signal VS. The separated synchronizing signal components SY are supplied to the character generator 22 connected to the counter 18. The character generator 22 produces character signals CH which correspond to the respective count signals CS. The character signals CH serve to display the corresponding counts and are, therefore, for use as the scene number signals. Each of the character signals CH is superposed on the corresponding one of the video signals VS with reference to the separated synchronizing signal components SY. The character signal CH may be repeatedly produced during a recording period of each scene.

In the example illustrated, a cue tone generator 26 is connected to the start button 16 to supply the video tape recorder 12 with cue tone signals CU of an audio frequency. The cue tone signals CU may be successively counted to specify the respective scenes, as will be described later.

The video tape recorder 12, in which a video tape (not shown in this figure) is preliminarily placed, records on the video tape the video signals VS in combination with the corresponding scene number signals. The cue tone signals CU are also recorded on the video tape. Thus, provision is made of a first or an original video tape.

During the period of each scene, a monitor display device 23 displays the scene represented by one of the video signals VS and the count represented by one of the scene number signals to monitor each of the video signals VS and the corresponding scene number signal.

Figure 2:
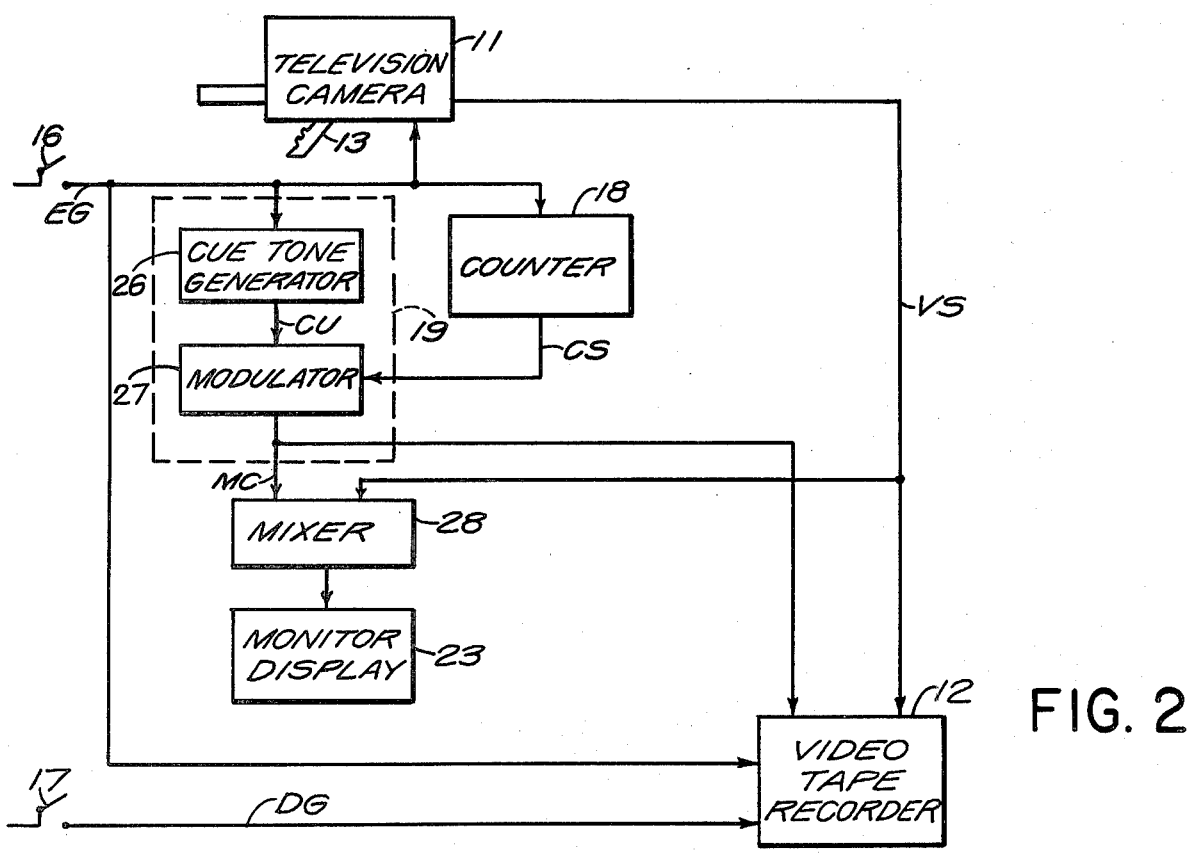
FIG. 2 is a block diagram of a system according to a second embodiment of this invention for use also as a scene number recording system.

FIG. 2 illustrates a system according to a second embodiment of this invention which is for use as a scene number recording system. The system of FIG. 2 is similar to that of FIG. 1 except that in the former a converter 19 comprises a cue tone generator 26 and a modulator 27 and a mixer 28 is coupled to the converter 19 and the television camera 11. More particularly, the cue tone generator 26 is connected to the start button 16 and is energized by the energizing pulses EG to repeatedly generate cue tone signals CU of an audio frequency. The cue tone signals CU are indicative of the beginnings of the respective ones of the successive scenes. Each of the cue tone signals CU lasts a predetermined period of time from the beginning of each scene. Connected to the cue tone generator 26 and the counter 18, the modulator 27 modifies the cue tone signals CU in response to the count signals CS into modified cue tone signals MC. The modified cue tone signals MC are supplied as the scene number signals to the video tape recorder 12.

Figure 3:
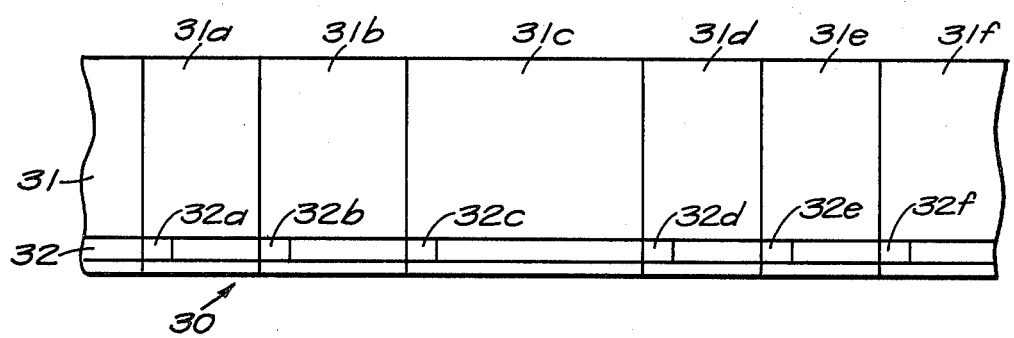
FIG. 3 diagrammatically shows a video tape on which a sequence of successive scenes are recorded together with a sequence of modified cue tone signals by the use of the system shown in FIG. 2.

Referring to FIG. 3, a video tape 30 on which the scenes are recorded by the video tape recorder 12 comprises first and second portions 31 and 32 for video signals and cue tone signals, respectively.

Referring to FIG. 3 together with FIG. 2, the video signals VS of first, second, third, fourth, fifth, and sixth scenes are successively arranged on first, second, third, fourth, fifth, and sixth areas 31a, 31b, 31c, 31d, 31e, and 31f of the first portion 31, respectively. The modified cue tone signals MC for the first through sixth scenes are recorded on the second portion 32 with areas 32a through 32f assigned to the respective modified cue tone signals MC. As shown in FIG. 3, each of the areas 32a through 32f has a predetermined width defined by leading and trailing ends thereof. The leading end of each area 32a–32f is approximately coincident with that of each of the first through sixth areas 31a through 31f. This is because the cue tone signals CU produced by the cue tone generator 26 are indicative of the beginnings of the scenes. Thus, the scene numbers are automatically recorded together with the corresponding scenes on the video tape to provide the first or original video tape.

Referring to FIG. 2 again, the modified cue tone signals MC and the video signals VS are supplied through the mixer 28 to the monitor display device 23 for displaying the scenes and the counts. From this fact, it is readily understood that the mixer 28 converts the modified cue tone signals MC to signals for visually displaying the scene numbers and superposes the signals on the video signals VS.

Figure 4:
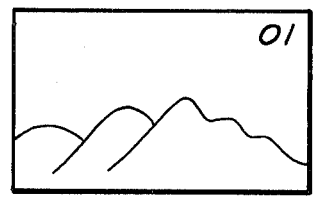
FIG. 4 is a view for illustrating a picture produced from the video tape depicted in FIG. 3.

Referring to FIG. 4, a scene number "01" is displayed on the monitor display device 23. This means that the first scene is being recorded on the first video tape, together with that one of the modified cue tone signals MC which is for displaying the scene number "01". On reproduction, the first scene is displayed together with the corresponding scene number "01".

Figure 5:
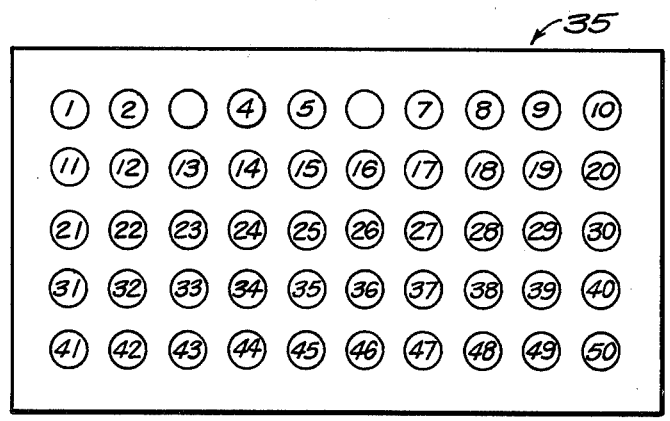
FIG. 5 is a view for illustrating a card for use in combination with the video tape depicted in FIG. 3.

Referring to FIG. 5, a card 35 of a sheet of somewhat thick paper is used for the pre-edition for providing the scene-selected video tape from the original video tape 30 obtained by the system according to the second embodiment. On the card 35, a sequence of successive or serial numbers 1 through 50 is preliminarily described with each of the successive numbers corresponding to each of the scene numbers. A circle encircling each of the successive numbers represents a groove which is previously cut in the card 35 with some portions (not shown) remaining uncut. Therefore, the card 35 can be easily punched at the respective numbers by lightly pushing the same by the use of a pencil, a pen, or the like. The card 35 may be used ot select the scenes from the original video tape obtained by the scene number recording system illustrated in FIG. 1.

When preparation is made of the original video tape as illustrated in FIG. 3 and of the card 35 as described in FIG. 5, the original video tape is reproduced to visually display the successive scenes in combination with the corresponding scene numbers. The successive scenes and the corresponding scene numbers may be individually displayed by the use of different display devices. At any rate, each scene may be reproduced simultaneously with the corresponding scene number.

The displayed scenes are monitored together with the displayed scene numbers by a director, who selects the successive scenes which are to be edited. The editor keeps the card 35 at hand. When the scenes to be selected are displayed, the editor punches, by the use of a pencil or the like, those numbers of the card which correspond to the selected ones of the successive scenes with reference to the scene numbers displayed in combination with the selected scenes. In the card 35 exemplified in FIG. 5, the numbers "3" and "6" among the successive numbers are punched or marked as marked numbers.

In this example the third and the sixth scenes are picked up as the selected scenes. Thus, a mark is recorded on the successive numbers corresponding to the selected scenes to provide a marked or punched card.

Figure 6:
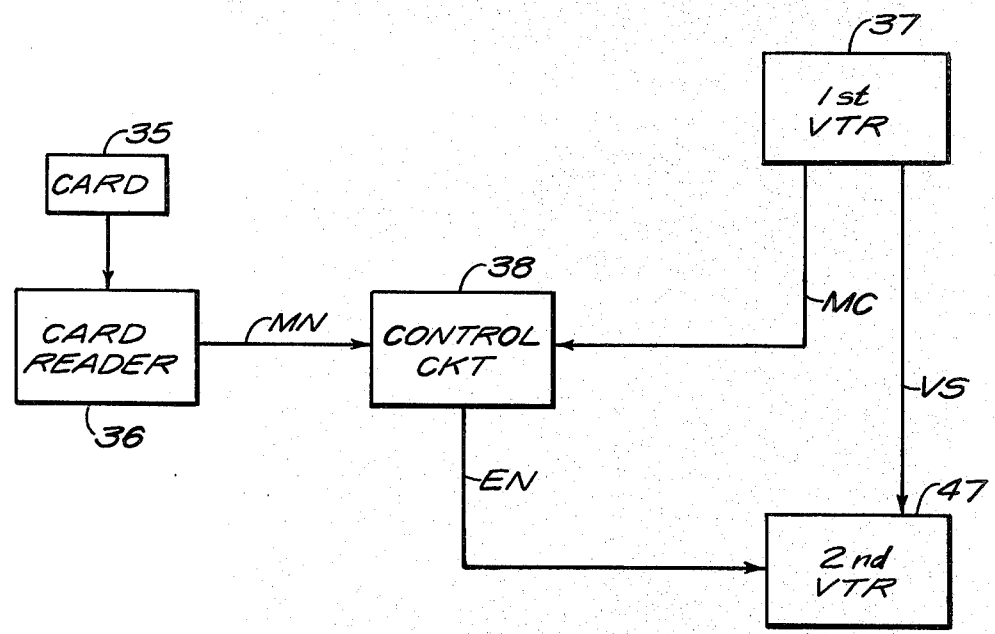
FIG. 6 is a block diagram of a system according to a third embodiment of this invention for use as a video-tape pre-editing system.

FIG. 6 illustrates a system according to a third embodiment of this invention, which is put into operation as an editing system in cooperation with the original video tape described with reference to FIG. 3 and the marked card 35 as illustrated with reference to FIG. 5. The editing system comprises a card reader 36 for reading the marked card to successively derive each marked number to produce a mark number signal MN representative of each marked number. A first video tape recorder 37 reproduces from the original video tape the video signals VS together with the corresponding modified cue tone signals MC.

Figure 7:
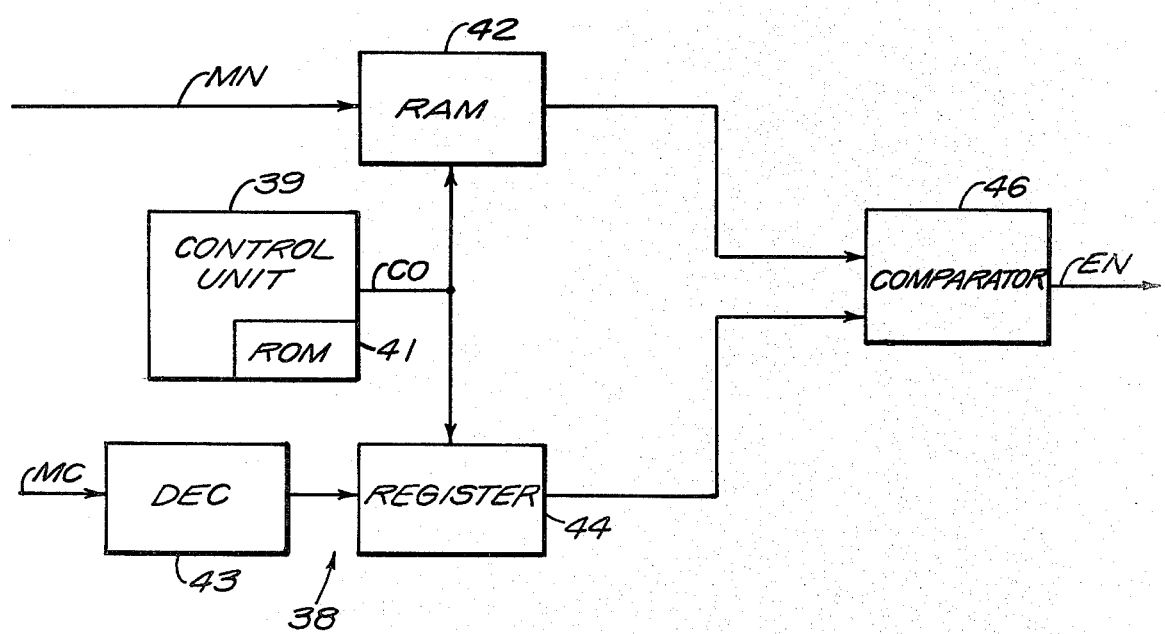
FIG. 7 is a block diagram of a control circuit for use in the system illustrated in FIG. 6.

Referring to FIG. 6 again and FIG. 7 afresh, the editing system comprises a control circuit 38 responsive to the marked number signal MN and the modified cue tone signals MC for producing an enable pulse EN at each instant when the marked number becomes equal to one of the scene numbers. The enable pulse EN lasts until the next following scene number signal is derived from the first video tape recorder 37. More particularly, the control circuit 38 comprises a control unit 39 comprising a read only memory 41 in which a control program defining the pre-editing operation is memorized. The control unit 39 delivers control signals CO in accordance with the program. Coupled to the control unit 39, a random access memory 42 has a predetermined number of addresses and successively memorizes the marked number signals MN at the addresses indicated by the control signals CO. For example, the marked numbers "3" and "6" are memorized in the first and the second addresses of the random access memory 42, respectively, when the card 35 shown in FIG. 5 is read by the card reader 36. The random access memory 42 is successively accessed from the first address in accordance with the program, as will presently be described. A decoder 43 decodes each of the modified cue tone signals MC into the count represented by each modified cue tone signal MC. Responsive to the control signals CO, a register 44 keeps the count until the next following count. During reproducing the original video tape, the counts are consecutively changed at every one of the successive scenes. A comparator 46 compares the marked number read out from the read only memory 42 with the count kept in the register 44 to produce the enable pulse EN when each marked number is coincident with each count. After the coincidence is detected by the comparator 46, the next following address of the read only memory 42 is accessed by the control unit 39 to read out the next following marked number. Similarly, comparison is carried out by the comparator 46 to detect the coincidence between the next following marked number and the next following count. Thus, the comparator 46 provides a sequence of indications indicative of the coincidence. In other words, the comparator 46 selects coincident scene numbers to produce a sequence of coincidence signals automatically in response to the coincidence signals.

It is noted here that the control circuit 38 may be used together with the first video tape recorded by the use of the system illustrated with reference to FIG. 1 if a counter is substituted for the decoder 43 and successively counts the cue tone signals CU recorded on the first video tape.

Referring again to FIG. 6, a second video recorder 47, in which a second video tape is placed, is responsive to the enable pulse EN and to the video signal sequence VS. The video signal sequence VS is consecutively supplied to the second video tape recorder 47. The second video recorder 47 is operable during the presence of the enable pulse EN. As a result, only the video signal corresponding to each of the selected scenes is automatically recorded on the second video tape with reference to the sequence of indications. Thus, the selected scenes are selectively and successively arranged on the second video tape to provide a scene-selected video tape.

While this invention has so far been described in conjunction with a few preferred embodiments thereof, it is readily possible for those skilled in the art to put this invention into practice in various manners. For example, the system illustrated with reference to FIGS. 6 and 7 is applicable to the original video tape recorded by the use of the recording system shown in FIG. 1, if the decoder 43 is capable of decoding the character signals into the counts even when no cue tone signals are recorded on the original video tape. Use is possible of a card of the type which inscribes a mark on the successive numbers, instead of the punched card illustrated in FIG. 5.

What is claimed is:

1. A method of rearranging a sequence of first scenes into a sequence of second scenes by the use of a first and a second video tape and a television camera having a start button, said second scene sequence being formed by selecting said first scene sequence, said method comprising the steps of:
   producing said first scenes for each operation of said start button;
   producing a scene number each time said start button is operated, said scene numbers being in one-to-one correspondence to said first scenes;
   recording said first scenes together with the corresponding scene numbers on said first video tape;
   preparing a card having thereon a sequence of successive numbers which are in one-to-one correspondence to said scene numbers;
   displaying said successive scenes together with the corresponding ones of said scene numbers;
   putting a mark on said card with reference to the scene number displayed together with each of said successive scenes to provide a marked card;
   comparing said first video tape with said marked card to select coincident scene numbers which are coincident with the marks put on said marked card;
   selecting said second scene sequence from the first scene sequence recorded on said first video tape in accordance with said coincidence scene numbers; and
   recording said second scene sequence on said second video tape.

* * * * *